INVENTORS
W. J. BRODERICK
C. R. FRASIER
L. A. HITTEL
G. R. HOPE, JR.
E. J. PORCELLI
L. L. RAKOCZI
BY

United States Patent Office 3,483,520

Patented Dec. 9, 1969

3,483,520

APPARATUS PROVIDING INTER-PROCESSOR COMMUNICATION IN A MULTICOMPUTER SYSTEM

William J. Broderick, Phoenix, Carlton R. Frasier, Glendale, and Lorenz A. Hittel, Phoenix, Ariz., George R. Hope, Jr., Largo, Fla., and Ernest J. Porcelli and Laszlo L. Rakoczi, Phoenix, Ariz., assignors to General Electric Company, a corporation of New York Filed Apr. 20, 1966, Ser. No. 544,023

Int. Cl. G11b *13/00*

U.S. Cl. 340—172.5 5 Claims

ABSTRACT OF THE DISCLOSURE

A multicomputer system is disclosed in which a plurality of data processors, one or more of which are input-output processors, have their communications with the data storage subsystem controlled by a central controller. To permit any one of the processors to communicate with any other processor, each processor has specific memory cells assigned to it to receive such communications. When a first processor needs to communicate with a second processor, it sends to the central controller a data word or words, the address of a cell in the memory subsystem assigned to the second processor and a signal identifying the second processor. The central controller causes the data words to be stored at the locations corresponding to the addresses supplied by the first processor, notifies the second processor that a data word has been stored in the memory locations assigned to it. The second processor in response to the notification sends to the central controller a signal representing the location in the memory where the data word is stored together with a control signal to cause the data word to be transmitted to it.

This invention relates to multicomputer systems and more particularly to apparatus for exercising management control of a multicomputer system.

A multicomputer system comprises a plurality of data processors, a plurality of data storage units, and a plurality of input devices and output devices. The data processors process data by executing separate programs or program parts simultaneously. The data storage units store data to be processed, data which is the result of processing, and programs for controlling the processing operations of the data processors. The input devices supply programs and data to be processed and the output devices receive and utilize processed data. Communication must be provided for the data processors to receive programs and data to be processed from the data storage units and to transmit processed data to the data storage units. In the multicomputer system described one or more input/output processors provide common control and data transmission centrals for a plurality of input devices and a plurality of output devices. Accordingly, communication must also be provided for the input/output processors to transfer programs and data to be processed to the data storage units from the input devices and to transfer processed data from the data storage units to the output devices.

The apparatus of the instant invention provides management control for such a multicomputer system. Generally, management control of the multicomputer system described comprises expeditiously supplying data to be processed and the programs providing the required data processing functions to the data processors, and efficiently controlling the output devices to receive and utilize the processed data. Such management control is effected by providing and controlling all required communications between the processors and data storage units; by providing for the assignment of programs to data processors for execution in accordance with the required urgencies for execution of the different programs, the availability of the required input and output devices, the availability of the required data storage space in the data storage units, and the relative capabilities of the data processors for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the processors, or when the processors become partially or totally inoperative, etc.

Each date processor of a multicomputer system executes a program separately from the programs being executed by the other data processors. The program comprises a set of instructions, each instruction specifying a discrete type of processing operation. A data processor executes a program by sequentially responding to each of the instructions of the program to perform the corresponding operations. The data processor obtains the intsructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processor supplies the corresponding addresses in sequence. Additionally, many of the instructions during execution require the data processor to further communicate with the data storage system, either to obtain a data item on which the data processor is to perform an operation or to store a data item which is the result of an operation. Accordingly, each instruction requiring the transfer of a data item between a data processor and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

Each input/output processor of a multicomputer system performs control and data transmission operations for its respective set of input and output devices separately from the operations being performed by the other input/output processors and separately from the programs being executed by the data processors. An input/output processor controls the storage of the data items provided by each of its associated input devices in a respective set of cells of the data storage system. Thus, in transmitting the data items supplied in succession by a particular input device an input/output processor supplies in sequence adresses of the cells of a cell set for receiving and storing the data items. Similarly, data items for transmission to each of its associated output devices are obtained by the input/output processor from a respective set of cells of the data storage system. Thus, in transmitting data items in succession to a particular output device an input/output processor also supplies in sequence addresses of the cells of the cell set storing the data items.

An input device is required to supply data to be processed when a program being executed by a data processor requires such data. An input device is required to supply a program for execution when the management control requires such program, following termination of execution of one or more of the programs presently in the data storage system. However, an input device may also voluntarily supply data and programs. An output device is required to receive data when a program being executed by a data processor has processed and made available in the data storage system a predetermined quantum of data.

When a data processor executing a program encounters an instruction or condition of operation requiring a particular input device to supply data to be processed or requiring a particular input device to supply a program or program part for execution by such data processor or another data processor, certain information must be prepared by the data processor and provided to this input device. This information must be communicated to the input device through the corresponding input/output processor. The information to be communicated, termed a "communication set" herein, comprises an identification of the particular input device required for the operation, an indication that the input device is to transmit information, the amount or quantum of information to be transmitted, and the starting address of the cell set of the data storage system to receive and store the information to be transmitted. Similarly, when a data processor executing a program encounters an instruction or condition of operation requiring a particular output device to receive a quantum of processed data, certain information must be prepared by the data processor and provided to this output device. Again, this information is to be communicated to the output device through the corresponding input/output processor. The communication set required in this instance comprises an identification of the particular output device required for the operation, an indication that the output device is to receive information, the quantum of information to be received, and the starting address of the cell set of the data storage system from which the information is to be obtained.

To provide most efficient operation of the above-described multicomputer system it is desirable to provide control apparatus to enable the data processors to execute their respective programs simultaneously and independently of each other, and to enable the input/output processors to execute their respective control and data transmission operations simultaneously and independently of each other and substantially independently of the data processors.

Accordingly, for most efficient operation of the multicomputer system, a data processor requiring an input or output device to perform a respective input or output operation should not be required to halt after preparation and presentation of the communication set until the related input/output processor is ready to accept the communication set. Instead, it is desirable to provide for freeing a data processor to continue to execute its program immediately following presentation of the communication set. Additionally, to obtain most efficient operation of the multicomputer system an input/output processor should be permitted to execute to completion any control or data transmission operation it is performing, without being required to suspend such operation to accept a communication set immediately upon presentation by a data processor. For an input/output processor required to suspend its current operation to accept a communication set, time-consuming functions are necessary to provide for interruption of the operation and to provide for resumption of the operation from the point of interuption after acceptance of the communication set. Furthermore, the apparatus required to effect such suspension in the input/output processor is complex and costly. Accordingly, it is desirable to provide control apparatus particularly directed to implement a multicomputer management control function enabling transfer of a communication set between a data processor and a particular input or output device without requiring the data processor to halt and without requiring suspension of the operation being performed by the related input/output processor.

In providing such control apparatus it is desirable further to provide for any one of the processors of the multicomputer system to be enabled to transmit information to any other processor of the system without either processor being required to halt and without the receiving processor being required to suspend its current operation.

Therefore, it is an object of this invention to provide improved management control apparatus for increasing the effectiveness and the efficiency of operation of a multicomputer system.

Another object of this invention is to provide improved management control apparatus for increasing the effectiveness of communication between the processors of a multicomputer system.

Another object of this invention is to provide improved management control apparatus for increasing the effectiveness of communication between a data processor and an input/output processor in a multicomputer system.

Another object of this invention is to provide improved apparatus for enabling a first processor to communicate with a second processor in a multicomputer system, without the first processor being required to halt or the second processor being required to suspend its current operation in effecting the communication.

To provide direct transmission of a communication set from a data processor to any one of the input/output processors and to provide reception of a communication set by an input/output processor directly from any one of the data processors, a complex and costly data transmission network would be required. Each data processor would require a separate data transmission link to transfer a communication set to each input/output processor and each input/output processor would require coupling to a data transmission link from each data processor in order to receive communication sets from all data processors. Furthermore, if further provision is to be made for enabling direct communication between each processor of a multicomputer system and any other processor of the system the required data communication network would be even more complex and costly. Accordingly, it is desirable to provide apparatus for enabling transfer of information between any two processors of a multicomputer system without employing the complex and costly data communication network required for the direct transmission of information therebetween.

Therefore, another object of this invention is to provide apparatus for effecting simple and inexpensive communication between the processors of a multicomputer system.

The foregoing objects are achieved, according to one embodiment of the instant invention, by providing a multicomputer system wherein a central controller provides indirect communication of information between the processors of the system by utilizing the data storage system as an element in the communication network. The central controller is coupled to communicate with all of the processors and the data storage system. A unique "mailbox" comprising one or more cells of the data storage system is assigned to each processor, each mailbox being adapted to store a communication set intended for the corresponding processor. A first of the processors, when ready to communicate with a second of the processors, supplies signals representing the communication set and the address of one of the cells of the mailbox assigned to the second processor.

Upon receipt of the communication set and address signals from the first processor, the central controller transmits the communication set signals to the data storage system and initiates an operation of the storage system for storing the communication set in the mailbox corresponding to the address signals. The first processor thereupon supplies a signal identifying the second processor to be the recipient of the communication set provided.

The central controller responds to the identification signal to transmit an "alert" signal to the second processor for providing notification to the second processor that a communication set is stored in the respective mailbox thereof. The first processor is thereupon freed to continue executing the program it had been executing when the communication set was provided or to execute a new program.

After the second processor completes the operation it had been executing upon receipt of the alert signal, it supplies signals representing the address of one of the cells of the second processor mailbox. The central controller receives and responds to the address signals supplied by the second processor to initiate an operation of the data storage system for retrieving the communication set from the second processor mailbox. The central controller thereupon transmits the retrieved communication set to the second processor.

Accordingly, the apparatus of the instant invention provides that any one of the processors of a multicomputer system is enabled to transmit information to any other processor of the system without either processor being required to halt to complete the communication and without the receiving processor being required to suspend its current operation. Additionally, the instant invention enables transfer of information between any two processors without requiring the costly and complex data transmission network which would be required for the direct transmission of information between the two communicating processors, by employing the data storage system as an element of an indirect communication network and by completing the network with the transmission links already provided between each processor and the data storage system.

Certain portions of the apparatus herein disclosed are not of our invention, but are the inventions of:

R. Barton, L. A. Hittel, L. L. Rakoczi, and J. B. Wiener, as defined by the claims of their application, Ser. No. 546,716, filed May 2, 1966;

C. R. Frasier, L. A. Hittel, J. R. Hudson, L. L. Rakoczi, D. L. Sansbury and J. B. Wiener, as defined by the claims of their application, Ser. No. 550,037, filed May 13, 1966;

J. P. Barlow, S. F. Aranyi, L. L. Rakoczi, and M. A. Torfeh, as defined by the claims of their application, Ser. No. 550,562, filed May 16, 1966;

J. E. Belt, L. A. Hittel, G. R. Hope, Jr., E. J. Porcelli, and L. L. Rakoczi, as defined by the claims of their application, Ser. No. 551,355, filed May 19, 1966;

S. F. Aranyi, J. P. Barlow, R. Barton, L. L. Rakoczi, and M. A. Torfeh, as defined by the claims of their application, Ser. No. 551,657, filed May 20, 1966;

J. P. Barlow, C. R. Jones, and J. L. Kerr, as defined by the claims of their application, Ser. No. 559,305, filed June 21, 1966;

W. W. Chu and N. R. Crain, as defined by the claims of their application, Ser. No. 559,497, filed June 22, 1966;

S. F. Aranyi, J. P. Barlow, E. J. Porcelli, L. L. Rakoczi, and M. A. Torfeh, as defined by the claims of their application, Ser. No. 568,343, filed July 27, 1966;

J. E. Belt, L. A. Hittel, and L. L. Rakoczi, as defined by the claims of their application, Ser. No. 612,560, filed Jan. 30, 1967;

J. P. Barlow, R. Barton, L. L. Rakoczi, and M. A. Torfeh, as defined by the claims of their application, Ser. No. 618,076, filed Feb. 23, 1967;

J. P. Barlow, R. Barton, E. J. Porcelli, L. L. Rakoczi, and M. A. Torfeh, as defined by the claims of their application, Ser. No. 619,377, filed Feb. 28, 1967;

S. F. Aranyi, J. P. Barlow, L. L. Rakoczi, L. A. Hittel, and M. A. Torfeh, as defined by the claims of their application, Ser. No. 623,284, filed Mar. 15, 1967; and J. R. Hudson, L. L. Rakoczi, and D. L. Sansbury, as defined by the claims of their application, Ser. No. 646,504, filed on June 16, 1967; all such applications being assigned to the assignee of the present application.

Description of the drawings

The invention will be described with reference to the accompanying drawings, wherein.

Figure 1:
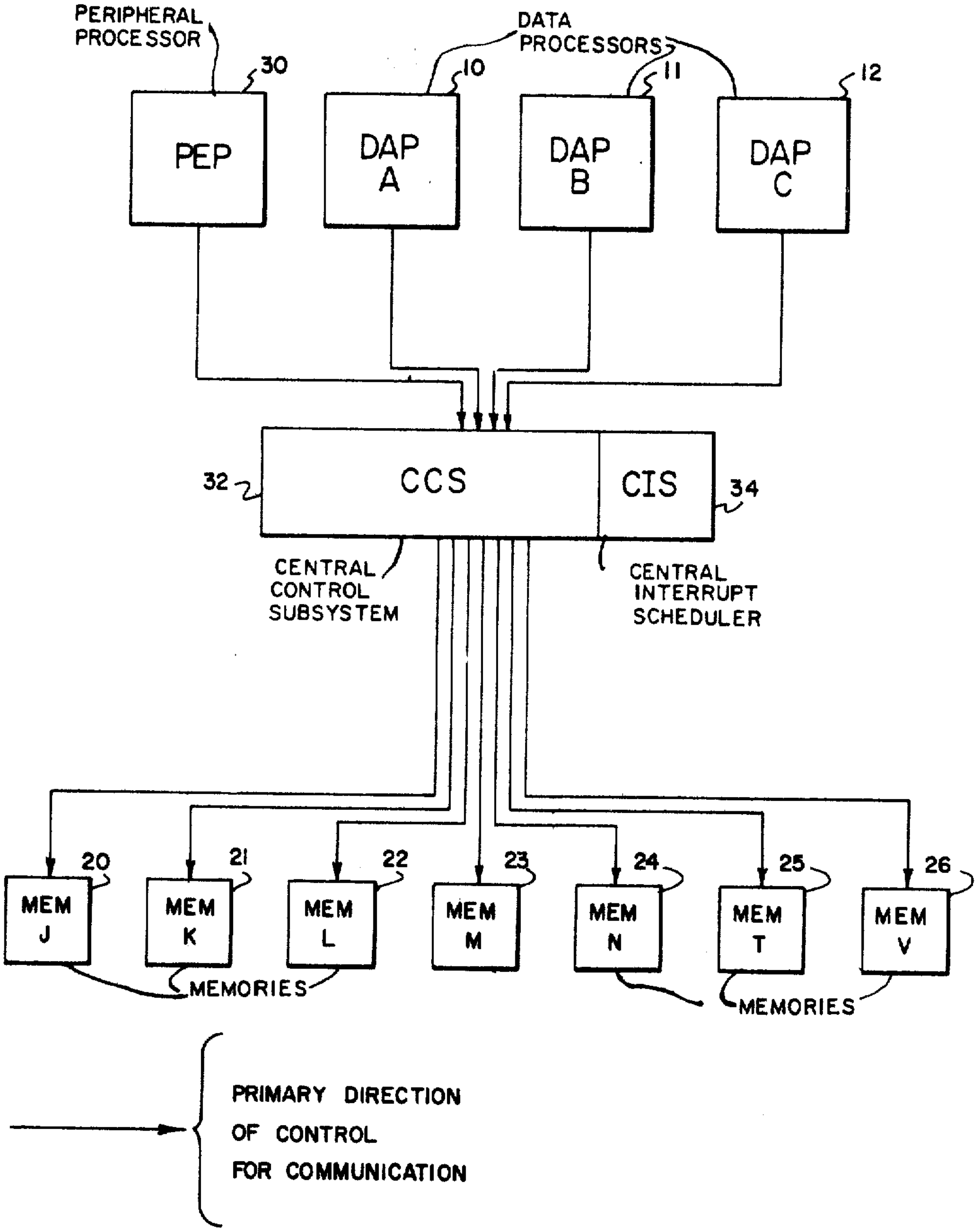
FIGURE 1 is a block diagram of a Multicomputer Data Processing System to which the instant invention is applicable.

For a complete description of FIGURE 1 and of our invention, reference is made to U.S. Patent No. 3,444,525 entitled "Centrally Controlled Multicomputer System" by Jesse P. Barlow et al., which is assigned to the assignee of the present invention. More particularly, attention is directed to Figures 2–110 of the drawings and to the specification beginning at column 8, line 4, and ending at column 173, line 9, inclusive, of U.S. Patent No. 3,444,525 which are incorporated herein by reference and made a part hereof as if fully set forth herein.

What is claimed is:

1. In combination: a plurality of data processors and a data storage member, said member being adapted to store a data word in each one of a plurality of addressable storage cells; a first of said processors supplying a data word, a representation of an address of one of said cells, and an identification of a second of said processors when said first processor is to communicate with said second processor; and a central controller coupled to said processors and to said storage member for receiving said data word, said representation, and said identification; said controller transferring said data word to said storage member, said member storing said data word in the one of said cells corresponding to said representation, said controller further responding to said identification of a second processor by transmitting a notification signal to said second processor, said second processor independently of said first processor responding to said notification signal to supply a representation of the address of said one cell to said controller to initiate the retrieval of said data word from said cell.

2. A data processing system comprising: a data processor, said data processor adapted to receive data words, to execute a sequence of different processing operations on received data words in response to a corresponding sequence of data words representing instructions, and to generate data words representing the results of said operations; an input-output processor, said input-output processor adapted to execute a sequence of operations for receiving and transmitting data words; a data storage member adapted to store a data word in each of a plurality of storage cells; said data processor supplying a data word and an identification of an input-output processor when said data processor is to communicate with said input-output processor; and a central controller coupled to said processors and to said data storage member for receiving said data word and for transferring said data word to said storage member, said member storing said data word in a cell of said member assigned to the input-output processor for this purpose, said controller in response to said identification transmitting a notification signal to the input-output processor; said input-output processor in response to said notification signal and independently of said data processor retrieving said data word from said member.

3. A data processing system comprising: a data processor, said data processor being adapted to receive data words, to execute a sequence of different processing operations on received data words in response to a corresponding sequence of data words representing instructions, and to generate data words representing the processed results of said operations; a plurality of input-output processors, each of said input-output processors being adapted to execute a sequence of operations for receiving and transmitting data words; a data storage member adapted to store a data word in each one of a plurality of addressable storage cells; said data processor supplying a plurality of data words, a representation of an address of one of said cells, and an identification of one of said input-output processors when said data processor is to communicate with said one input-output processor; and a central controller coupled to said processors and to said data storage member for receiving said data words, said representation, and said identification, said controller transferring said data words to said storage member to provide storage of said data words in cells of said member, the first word being stored in a cell corresponding to said representation, said controller in response to said identification transmitting a notification signal to said one input-output processor, said one input-output processor responding to the received notification signal by supplying a representation of the address of said one cell in which the first data word is stored to cause said controller to initiate the retrieval of said data words stored in said member by said data processor.

4. In combination: a plurality of data processors and a data storage member, said member being adapted to store a data word in each one of its plurality of addressable storage cells, a first of said processors supplying signals comprising a plurality of data words, an address, and an identification of a second of said processors when said first processor is to communicate with said second processor, said address signals correponding to a particular one of aid cells which is assigned to receive information for said second processor, and a central controller coupled to said processors and to said storage member for receiving said signals, said controller transferring said signals comprising said data words to said storage member to store representations of said data words in the cells of said member, the first word being stored in a cell corresponding to said address signals, said controller responding to said identification signals by transmitting a notification signal to said second processor, each of said processors, responding to the receipt of a notification signal independently of the processor supplying the identification signals, by supplying address signals corresponding to the cells assigned to it, said central controller responding to address signals supplied by said second processor for transferring to said second processor the data word stored in the cells assigned to receive information for said second processor.

5. A data processing system comprising: a plurality of data processors, each of said data processors being adapted to receive data words, to execute a sequence of different processing operations on received data words in response to a corresponding sequence of data words representing instructions, and to generate data words representing the processed results of said operations; a plurality of input-output processors, each of said input-output processors being adapted to execute a sequence of operations for receiving and transmitting data words; a data storage member adapted to store a data word in each one of the plurality of addressable storage cells; one of said data processors supplying signals comprising a data word, and address, and an identification of one of said input-output processors when said one data processor is to communicate with said one input-out processor, said address signals corresponding to a particular one of the cells of said member, said cell being assigned to receive information for said one input-output processor; and a central controller coupled to said processors and to said data storage member for receiving said signals, said controller transferring said signals comprising a data word to said storage member to cause a representation of said data word to be stored in the cell corresponding to said address signals, said controller further responding to said identification signals for transmitting an alert signal to said one input-output processor; each of said input-output processors independently of said data processors being responsive to an alert signal to supply address signals corresponding to the cell assigned to said one input-output processor; said central controller responding to the address signals supplied by said one input-output processor for transferring to said one input-output processor the data word stored in a cell assigned to said one input-output processor.

References Cited

UNITED STATES PATENTS

| | | | |
|---|---|---|---|
| 3,251,040 | 5/1966 | Burkholder et al. | 340—172.5 |
| 3,283,308 | 11/1966 | Klein et al. | 340—172.5 |
| 3,293,610 | 12/1966 | Epperson et al. | 340—172.5 |
| 3,312,951 | 4/1967 | Hertz | 340—172.5 |
| 3,323,109 | 5/1967 | Hecht et al. | 340—172.5 |
| 3,350,689 | 10/1967 | Underhill et al. | 340—172.5 |
| 3,029,414 | 4/1062 | Schrimpf | 340—172.5 |
| 3,061,192 | 10/1962 | Terzian | 235—157 |
| 3,063,036 | 11/1962 | Reach | 340—172.5 |
| 3,074,636 | 1/1963 | Baker | 235—157 |
| 3,200,380 | 8/1965 | MacDonald | 340—172.5 |
| 3,242,467 | 3/1966 | Lamy | 340—172.5 |

JOHN P. VANDENBURG, Primary Examiner